United States Patent
Lee et al.

(10) Patent No.: US 11,749,459 B2
(45) Date of Patent: Sep. 5, 2023

(54) MULTILAYER CAPACITOR

(71) Applicant: SAMSUNG ELECTRO-MECHANICS CO., LTD., Suwon-si (KR)

(72) Inventors: Jang Yeol Lee, Suwon-si (KR); Hye Min Bang, Suwon-si (KR); Ho Phil Jung, Suwon-si (KR); Sung Min Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/307,395

(22) Filed: May 4, 2021

(65) Prior Publication Data

US 2022/0172899 A1 Jun. 2, 2022

(30) Foreign Application Priority Data

Nov. 27, 2020 (KR) .................. 10-2020-0162564

(51) Int. Cl.
| | |
|---|---|
| H01G 4/30 | (2006.01) |
| H01G 4/248 | (2006.01) |
| H01G 4/14 | (2006.01) |
| H01G 4/012 | (2006.01) |

(52) U.S. Cl.
CPC ............. *H01G 4/30* (2013.01); *H01G 4/012* (2013.01); *H01G 4/14* (2013.01); *H01G 4/248* (2013.01)

(58) Field of Classification Search
None
See application file for complete search history.

(56) References Cited

U.S. PATENT DOCUMENTS

| | | | | |
|---|---|---|---|---|
| 5,339,068 | A | * | 8/1994 | Tsunoda .............. H01C 1/142 338/308 |
| 7,403,369 | B2 | | 7/2008 | Roy |
| 9,370,102 | B2 | * | 6/2016 | Lee .................. H01G 4/2325 |
| 9,959,973 | B2 | * | 5/2018 | Saito ..................... H01G 4/30 |
| 10,366,834 | B1 | * | 7/2019 | Lee ..................... H01G 4/248 |
| 10,770,232 | B2 | * | 9/2020 | Han ...................... H01G 4/232 |

(Continued)

FOREIGN PATENT DOCUMENTS

| | | |
|---|---|---|
| JP | WO2007/119281 A1 | 10/2007 |
| JP | 2017-103321 A | 6/2017 |

(Continued)

*Primary Examiner* — Dion R. Ferguson
(74) *Attorney, Agent, or Firm* — MORGAN, LEWIS & BOCKIUS LLP (57) ABSTRACT

A multilayer capacitor includes a body including a stack structure in which a plurality of dielectric layers are stacked and a plurality of internal electrodes are stacked with the dielectric layers interposed therebetween, external electrodes disposed on an external surface of the body to be connected to the internal electrodes, and including a first electrode layer disposed on a first surface of the body to which the internal electrodes are exposed, and a second electrode layer covering the first electrode layer, a first insulating coating layer disposed between the first and second electrode layers and having a discontinuous region, and a second insulating coating layer having a discontinuous region to cover at least a portion of a surface of the body. The second insulating coating layer is exposed from the external electrodes.

20 Claims, 5 Drawing Sheets

(56) References Cited

U.S. PATENT DOCUMENTS

| | | | |
|---|---|---|---|
| 11,183,332 B2* | 11/2021 | Kim | H01G 4/224 |
| 11,302,480 B2* | 4/2022 | Takahashi | H01G 4/2325 |
| 2008/0151470 A1 | 6/2008 | Motoki et al. | |
| 2009/0290284 A1* | 11/2009 | Gabler | H01G 4/2325 |
| | | | 361/321.1 |
| 2010/0290172 A1* | 11/2010 | Motoki | H01G 4/2325 |
| | | | 427/79 |
| 2011/0170227 A1* | 7/2011 | Schmid | H05K 1/056 |
| | | | 174/257 |
| 2012/0313489 A1* | 12/2012 | Shirakawa | H01G 4/012 |
| | | | 336/200 |
| 2013/0299215 A1* | 11/2013 | Taseda | H01G 4/2325 |
| | | | 174/255 |
| 2014/0182907 A1* | 7/2014 | Lee | H01G 4/232 |
| | | | 174/258 |
| 2015/0053472 A1* | 2/2015 | Lee | H01G 4/232 |
| | | | 361/301.4 |
| 2016/0086733 A1* | 3/2016 | Saito | H01G 4/1227 |
| | | | 205/183 |
| 2016/0172110 A1* | 6/2016 | Otani | H01G 4/30 |
| | | | 361/301.4 |
| 2017/0047165 A1* | 2/2017 | Saeki | H01G 4/33 |
| 2017/0154731 A1 | 6/2017 | Tahara et al. | |
| 2017/0256359 A1* | 9/2017 | Masunari | H01G 4/005 |
| 2018/0082786 A1 | 3/2018 | Asano et al. | |
| 2019/0355520 A1* | 11/2019 | Nakamura | H01G 4/30 |
| 2021/0005384 A1* | 1/2021 | Lee | H01G 4/2325 |
| 2021/0065986 A1* | 3/2021 | Kim | H01G 4/008 |
| 2021/0082622 A1* | 3/2021 | Kim | H01G 4/232 |
| 2021/0193391 A1* | 6/2021 | Yi | H01G 4/012 |
| 2021/0272753 A1* | 9/2021 | Chikuma | H01G 4/232 |
| 2022/0013291 A1* | 1/2022 | Nishisaka | H01G 4/008 |
| 2022/0139616 A1* | 5/2022 | Kang | H01G 4/248 |
| | | | 361/301.4 |

FOREIGN PATENT DOCUMENTS

| | | | |
|---|---|---|---|
| KR | 101452131 B1 * | 10/2014 | |
| KR | 10-2018-0031567 A | 3/2018 | |
| KR | 10-2019-0116161 A | 10/2019 | |

* cited by examiner

MULTILAYER CAPACITOR

CROSS-REFERENCE TO RELATED APPLICATION(S)

This application claims benefit of priority to Korean Patent Application No. 10-2020-0162564 filed on Nov. 27, 2020 in the Korean Intellectual Property Office, the disclosure of which is incorporated herein by reference in its entirety.

TECHNICAL FIELD

The present disclosure relates to a multilayer capacitor.

BACKGROUND

A capacitor is an element capable of storing electricity, and generally uses a principle that electricity is accumulated in each electrode when a voltage is applied by opposing two electrodes. When a direct current (DC) voltage is applied to the capacitor, a current flows in the capacitor while the electricity is accumulated, but when the accumulation of the electricity is completed, the current does not flow in the capacitor. Meanwhile, when an alternating current (AC) voltage is applied to the capacitor, an alternating current flows in the capacitor while polarities of the electrodes are alternated.

Such a capacitor may be classified into several kinds of capacitors such as an aluminum electrolytic capacitor in which electrodes are formed of aluminum and a thin oxide layer is disposed between the electrodes formed of aluminum, a tantalum capacitor in which tantalum is used as an electrode material, a ceramic capacitor in which a dielectric material having a high dielectric constant such as a barium titanate is used between electrodes, a multilayer ceramic capacitor (MLCC) in which ceramic having a high dielectric constant is used in a multilayer structure as a dielectric material provided between electrodes, a film capacitor in which a polystyrene film is used as a dielectric material provided between electrodes, and the like, depending on a kind of insulator provided between electrodes.

Among them, the multilayer ceramic capacitor has been recently used mainly in various fields such as a high frequency circuit, and the like, since it has excellent temperature characteristics and frequency characteristics and may be implemented at a small size. In recent years, attempts to implement a smaller multilayer ceramic capacitor continue, and to this end, dielectric layers and internal electrodes are formed thinly.

In recent years, in the field of multilayer capacitor, many attempts have been made to improve moisture resistance reliability by reducing defects caused by penetration of moisture or plating solutions. As one method, when a cover layer of a capacitor body or an external electrode is formed to be thick, there is a problem that a size of a component increases and a capacitance decreases at the same size.

SUMMARY

An aspect of the present disclosure may provide a multilayer capacitor having improved moisture resistance reliability.

According to an aspect of the present disclosure, a multilayer capacitor may include a body including a stack structure in which a plurality of dielectric layers are stacked and first and second internal electrodes are stacked with one of the plurality of dielectric layers interposed therebetween; a first external electrode connected to the first internal electrodes, and including a first electrode layer disposed on a first surface of the body to which the first internal electrodes are exposed, and a second electrode layer covering the first electrode layer; a second external electrode connected to the second internal electrodes, and including a third electrode layer disposed on a second surface of the body to which the second internal electrodes are exposed, and a fourth electrode layer covering the third electrode layer; a first insulating coating layer disposed between the first and second electrode layers and between the third and fourth electrode layers, and having a first discontinuous region; and a second insulating coating layer disposed on the body and having a second discontinuous region, the second insulating coating layer exposed from the first and second external electrodes.

The first insulating coating layer may include a plurality of aggregates, and a region between the plurality of aggregates may correspond to the first discontinuous region.

A surface of the first electrode layer may have a groove, and the first insulating coating layer may be disposed in the groove in the first electrode layer.

A region filling the groove in the first electrode layer in the first insulating coating layer may be disposed on an inner wall of the groove in the first electrode layer.

The first electrode layer may be a sintered electrode, and the second electrode layer may be a plating layer.

A surface of the body may have a groove, and the second insulating coating layer may be disposed in the groove.

A region filling the groove in the body in the second insulating coating layer may be disposed on an inner wall of the groove in the body.

The first and second insulating coating layers may be connected to each other.

The first and second insulating coating layers may include the same material.

The second electrode layer or the fourth electrode layer may cover a portion of the second insulating coating layer.

The first and second insulating coating layers may include at least one of Si-based and F-based polymers.

An area occupied by the first discontinuous region in the first insulating coating layer may be greater than 90% of an area of the first insulating coating layer including the first discontinuous region.

An area occupied by the second discontinuous region in the second insulating coating layer may be greater than 70% of an area of the second insulating coating layer including the second discontinuous region.

An area ratio of an area of the first discontinuous region to an area of the first insulating coating layer including the first discontinuous region may be different from an area ratio of an area of the second discontinuous region to an area of the second insulating coating layer including the second discontinuous region.

The area ratio of the area of the first discontinuous region to the area of the first insulating coating layer including the first discontinuous region may be higher than the area ratio of the area of the second discontinuous region to the area of the second insulating coating layer including the second discontinuous region.

A thickness of the first insulating coating layer may be 2 µm or less.

A thickness of the second insulating coating layer may be 2 µm or less.

The second electrode layer or the fourth electrode layer may be disposed in the discontinuous region of the first insulating coating layer.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, exemplary embodiments in the present disclosure will be described in detail with reference to the accompanying drawings. However, the exemplary embodiments in the present disclosure may be modified in many different forms and the scope of the present disclosure is not limited to the exemplary embodiments described below. In addition, the exemplary embodiments in the present disclosure are provided in order to more completely explain the present disclosure to a person skilled in the art. Therefore, the shapes and sizes of elements in the drawings may be exaggerated for clearer description, and elements indicated by the same reference numerals in the drawings are the same elements.

In addition, in the drawings, portions unrelated to the description will be omitted in order to clearly describe the present disclosure, thicknesses of several layers and regions are exaggerated for clarity, and components having the same functions within the scope of the same idea will be denoted by the same reference numerals. Further, throughout the specification, when a certain portion "includes" a certain component, it means that other components may be further included rather than excluding other components unless otherwise stated.

Figure 1:
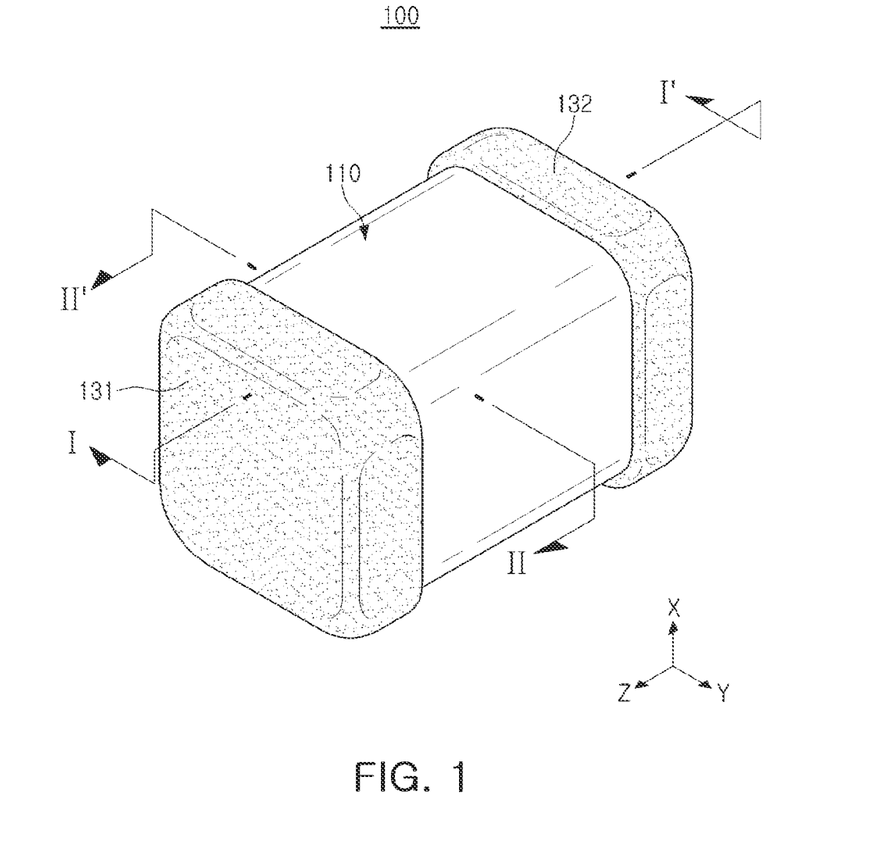
FIG. 1 is a schematic perspective view illustrating an appearance of a multilayer capacitor according to an exemplary embodiment in the present disclosure.
Figure 2:
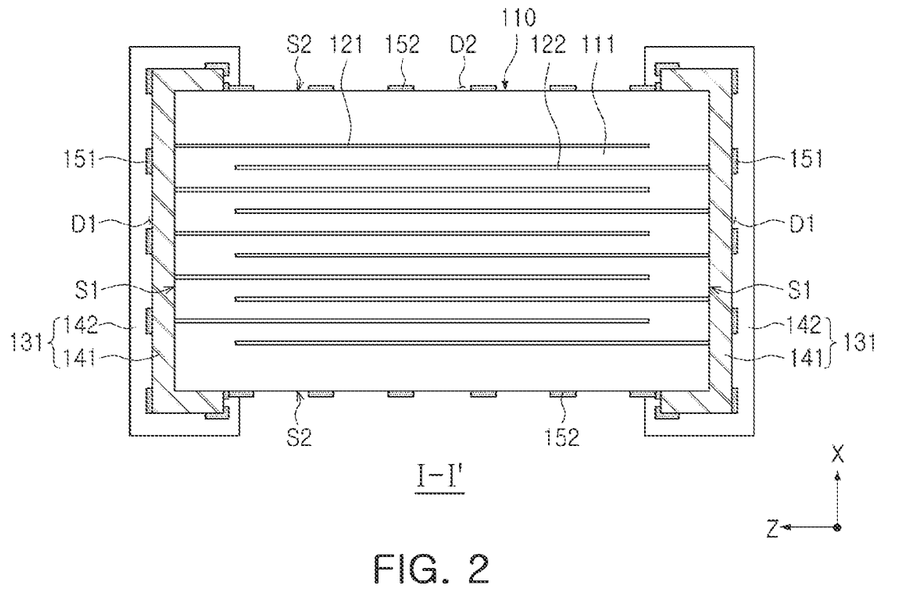
FIG. 2 is a cross-sectional view taken along line I-I' of the multilayer capacitor of FIG. 1.
Figure 3:
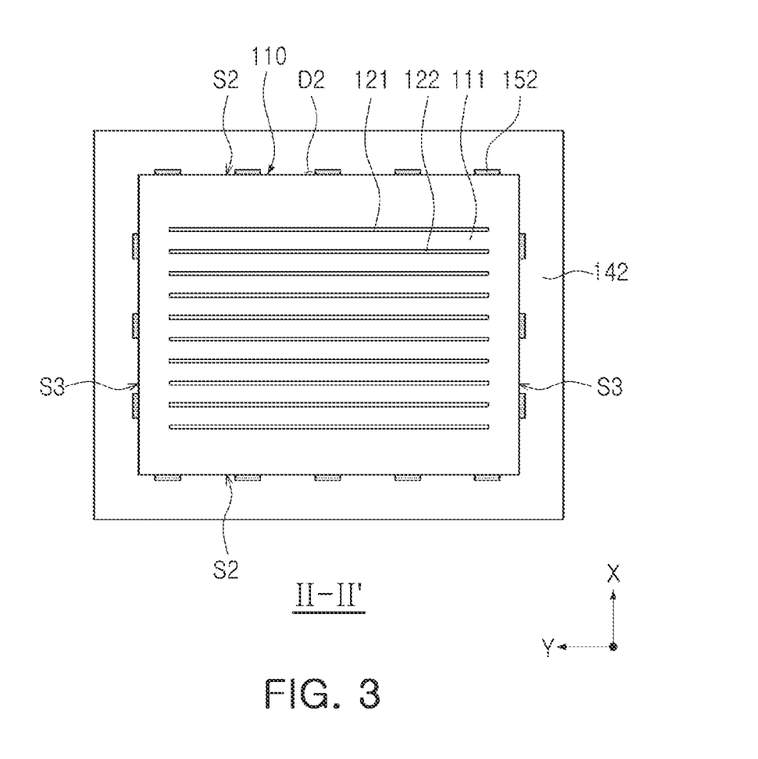
FIG. 3 is a cross-sectional view taken along line II-II' of the multilayer capacitor of FIG. 1.

FIG. 1 is a schematic perspective view illustrating an appearance of a multilayer capacitor according to an exemplary embodiment in the present disclosure. FIGS. 2 and 3 are cross-sectional views taken along lines I-I' and II-II' of the multilayer capacitor of FIG. 1, respectively. In addition, FIGS. 4 through 8 are enlarged views of a region of FIG. 2.

Referring to FIGS. 1 through 3, a multilayer capacitor 100 according to an exemplary embodiment in the present disclosure may include a body 110 including dielectric layers 111 and a plurality of internal electrodes 121 and 122 stacked with each of the dielectric layers 111 interposed therebetween, external electrodes 131 and 132, and first and second insulating coating layers 151 and 152. Here, the first and second insulating coating layers 151 and 152 may prevent the intrusion of moisture or plating solution from the outside. The first insulating coating layer 151 may have first discontinuous region D1, and the second insulating coating layer 152 may have second discontinuous region D2.

The body 110 may include a plurality of dielectric layers 111, and may be obtained by stacking and then sintering, for example, a plurality of green sheets. The plurality of dielectric layers 111 may have a form in which they are integrated with one another by such a sintering process. In addition, as illustrated in FIG. 1, the body 110 may have a rectangular parallelepiped shape. The dielectric layer 111 included in the body 110 may include a ceramic material having a high dielectric constant, for example, a BT-based ceramic material, that is, barium titanate ($BaTiO_3$)-based ceramic material, but may include other materials known in the related art as long as a sufficient capacitance may be obtained. The dielectric layer 111 may further include additives, organic solvents, plasticizers, binders, dispersants, and the like, if necessary, together with the ceramic material, which is a main component. Here, the additives may be added in a metal oxide form in a manufacturing process. Examples of such a metal oxide additive may include at least one of $MnO_2$, $Dy_2O_3$, $BaO$, $MgO$, $Al_2O_3$, $SiO_2$, $Cr_2O_3$, and $CaCO_3$.

Each of the plurality of internal electrodes 121 and 122 may be obtained by printing and then sintering a paste including a conductive metal at a predetermined thickness on one surface of the ceramic green sheet. In this case, the plurality of internal electrodes 121 and 122 may include first and second internal electrodes 121 and 122 exposed in directions of the body 110 opposing each other (Z direction based on the drawing), and a surface of the body 110 to which the first and second internal electrodes 121 and 122 are exposed will be defined as a first surface S1. The first and second internal electrodes 121 and 122 may be connected to different external electrodes 131 and 132, respectively, to have different polarities when the multilayer capacitor is driven, and may be electrically separated from each other by each of the dielectric layers 111 disposed therebetween. However, according to another exemplary embodiment, the number of external electrodes 131 and 132 or a connection manner of the internal electrodes 121 and 122 may be changed. An example of a main material constituting the internal electrodes 121 and 122 may include copper (Cu), nickel (Ni), or the like, or alloys thereof.

The external electrodes 131 and 132 may include first and second external electrodes 131 and 132 formed on external surfaces of the body 110 and electrically connected to the first and second internal electrodes 121 and 122, respectively. The external electrodes 131 and 132 may include a first electrode layer 141 and a second electrode layer 142.

The first electrode layer 141 may be disposed on the first surface S1 of the body 110. Here, the first surface S1 may correspond to the surface to which the internal electrodes 121 and 122 are exposed. The first electrode layer 141 may be connected to the internal electrodes 121 and 122 and may be formed of a conductive material such as copper (Cu), nickel (Ni), or an alloy thereof. The first electrode layer 141 may be formed by transferring, printing, or dipping a conductive paste on the first surface S1 of the body 110. Accordingly, the first electrode layer 141 may be implemented in the form of a sintered electrode. In this case, the first electrode layer 141 may be formed on all of a second surface S2 perpendicular to a stacking direction (X direction) of the internal electrodes 121 and 122, and a third surface S3 perpendicular to the first and second surfaces S1 and S2, in addition to the first surface S1 of the body 110. However, depending on the exemplary embodiment, the first electrode layer 141 may also be formed only on the first surface S1 of the body 110. The second electrode layer 142 may cover the first electrode layer 141 and may be a plating layer. The second electrode layer 142 may be implemented in a multilayer structure including nickel (Ni), tin (Sn), or the like.

Figure 4:
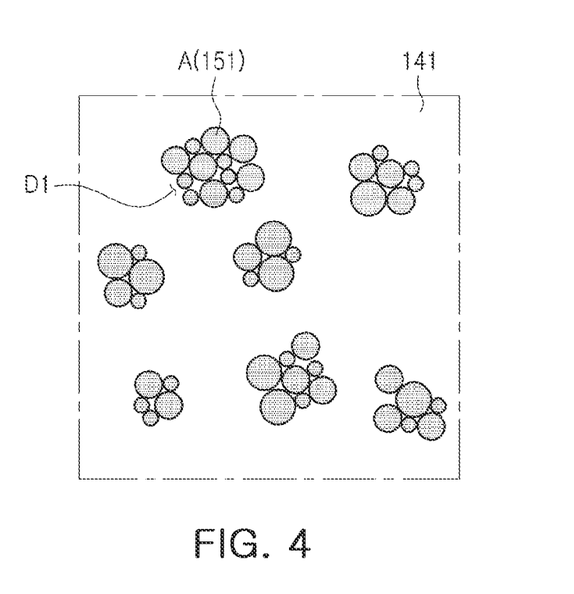
FIGS. 4 through 8 are enlarged views of a region of FIG. 2.

The first insulating coating layer 151 may be disposed between the first and second electrode layers 141 and 142 and may have first discontinuous region D1 as illustrated in FIG. 4. The first insulating coating layer 151 may effectively block a plating solution from penetrating into the body 110 through the first electrode layer 141. In this case, the first insulating coating layer 151 may prevent the second electrode layer 152 from penetrating into the body 110 by filling a portion where the first electrode layer 141 is cut, for example, a groove in the surface of the first electrode layer 141, thereby allowing the second electrode layer 142 to be formed structurally densely and stably. In consideration of such a function, in the present exemplary embodiment, by implementing the first insulating coating layer 151 with an insulating material that may be coated relatively thinly and uniformly, for example, a water-repellent material, the size of the external electrodes 131 and 132 may be kept small, while improving moisture resistance blocking characteristics. It is preferable to select a material constituting the first insulating coating layer 151 by considering such a function, and for example, the first insulating coating layer 151 may include at least one of Si-based and F-based polymers.

The first insulating coating layer 151 may include the first discontinuous region D1. Here, at least some of the first discontinuous region D1 may be filled with at least one of the first and second electrode layers 141 and 142 so that the first and second electrode layers 141 and 142 may be connected to each other. Here, when the first insulating coating layer 151 and the second electrode layer 142 are formed after sintering the first electrode layer 141, the second electrode layer 142 may be filled in the first discontinuous region D1 as illustrated in FIG. 2. Electrical connection paths between the first and second electrode layers 141 and 142 may be formed by the first discontinuous region D1. The first discontinuous region D1 of the first insulating coating layer 151 may be obtained by forming the first insulating coating layer 151 and then removing a portion of the first insulating coating layer 151 by polishing or etching the first insulating coating layer 151. As a specific example of the first insulating coating layer 151, as illustrated in FIG. 4, the first insulating coating layer 151 may include a plurality of aggregates A, and a region between the plurality of aggregates A correspond to the discontinuous region D1.

Figure 5:
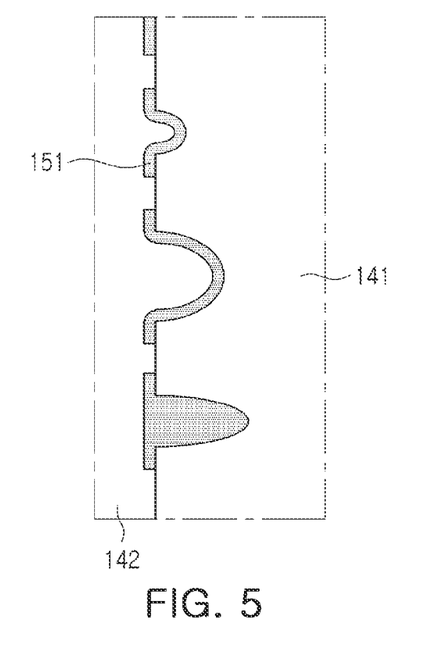
Figure 6:
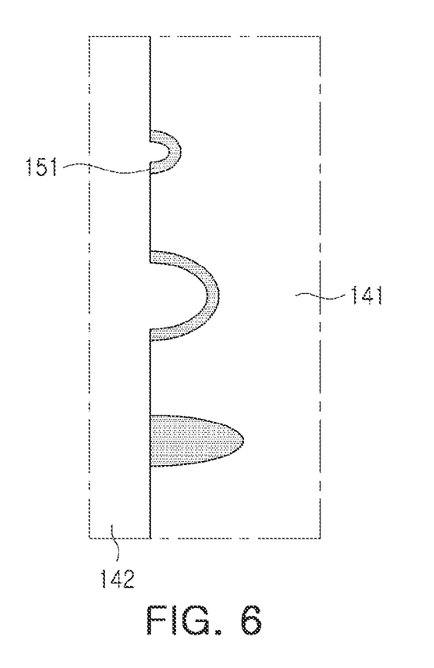

As illustrated in FIGS. 5 and 6, the first insulating coating layer 151 may fill the grooves formed on the surface of the first electrode layer 141, and may effectively prevent penetration of moisture or a plating solution through defects in the first electrode layer 141. In this case, the regions filling the grooves of the first electrode layer 141 in the first insulating coating layer 151 may have a shape (two of the upper portion in FIGS. 5 and 6) coating inner walls of the grooves of the first electrode layer 141, and may have a shape (one of the lower portion in FIGS. 5 and 6) completely filling the groove in the first electrode layer 141. As illustrated, various shapes of the first insulating coating layer 151 may be mixed, and it is not necessary to completely fill the grooves of the first electrode layer 141. In the present exemplary embodiment, by forming the first discontinuous region D1 in the first insulating coating layer 151, the electrical connection path between the first and second electrode layers 141 and 142 may be secured, and the second electrode layer 142 may be formed densely and stably. Accordingly, when the second electrode layer 142 is implemented as a plating layer, plating defects may be reduced. In one example, when the first insulating coating layer 151 is removed by polishing or etching, all of the remaining regions other than the regions filling the grooves of the first electrode layer 141 may be removed as in the exemplary embodiment of FIG. 6. In addition, an area occupied by the first discontinuous region D1 in the first insulating coating layer 151 may be determined in consideration of such a function of the first discontinuous region D1, and preferably, the area occupied by the first discontinuous region D1 in the first insulating coating layer 151 may be greater than 90%. In one example, the area occupied by the first discontinuous region D1 in the first insulating coating layer 151 may refer to an area ratio of an area of the first discontinuous region in one unit area to the one unit area on which the first insulating coating layer 151 including the first discontinuous region is disposed. In one example, the area occupied by the first discontinuous region D1 in the first insulating coating layer 151 may be determined in a cross section of the multilayer capacitor 100, and the area occupied by the first discontinuous region D1 in the first insulating coating layer 151 may be calculated based on, for example, a sum of lengths of sections of the first discontinuous region D1 in the cross-section to a total length of the first insulating coating layer 151 including the first discontinuous region D1. The measurement may be performed in a region of the cross section determined by one of ordinary skill in the art. In one example, an optical microscope or a scanning electron microscope (SEM) may be used in the measurement, although the present disclosure is not limited thereto. Other methods and/or tools appreciated by one of ordinary skill in the art, even if not described in the present disclosure, may also be used. In addition, a thickness of the first insulating coating layer 151 may be 2 μm or less, and when the first insulating coating layer 151 is too thick, the formation of the second electrode layer 142 may be hindered, and electrical characteristics of the external electrodes 131 and 132 may be deteriorated. The thickness of the first insulating coating layer 151 may be measured based on, for example, the thickest region. In one example, the thickness of the first insulating coating layer 151 may be measured based on the thickest region in a measured region in a cross section of the multilayer capacitor 100.

The second insulating coating layer 152 may cover at least a portion of a surface of the body 110 on which the external electrodes 131 and 132 are not disposed. In the present exemplary embodiment, the second insulating coating layer 152 may cover the second surface S2 and the third surface S3 of the body 110. However, the second insulating coating layer 152 may cover only one of the second surface S2 and the third surface S3. As illustrated in FIG. 2, the first and second insulating coating layers 151 and 152 may be connected to each other. In addition, the first and second insulating coating layers 151 and 152 may include the same material, and for example, the second insulating coating layer 152 may include at least one of Si-based and F-based polymers. The first and second insulating coating layers 151 and 152 may be formed of the same material at the same time to cover the first electrode layer 141 and the body 110, respectively. When the second electrode layer 142 is formed after the first and second insulating coating layers 151 and 152 are formed, the second electrode layer 142 may cover a portion of the second insulating coating layer 152 as illustrated.

The second insulating coating layer 152 may include second discontinuous region D2, and similarly to the first insulating coating layer 151, the second discontinuous region D2 may be formed by polishing or etching the second insulating coating layer 152. The inventors of the present disclosure have found that the more the second insulating coating layer 152 covers the surface of the body 110, the more advantageous it is in terms of moisture resistance reliability, but when mounting the multilayer capacitor 100 on a substrate or the like, a mounting distortion problem occurs. This can be seen that when the second insulating coating layer 152 is formed of a water-repellent material, static electricity is easily induced by charging with an external contact material, resulting in component distortion during mounting. In addition, when a large amount of the second insulating coating layer 152 is present around the second electrode layer 142, solder and the second insulating coating layer 152 are less wetted at the time of mounting the multilayer capacitor 100, and as a result, reflow defects may occur. In order to reduce such side effects, the second discontinuous region D2 are formed on the second insulating coating layer 152, and in this case, a ratio occupied by the second discontinuous region D2 may be greater than 70%. The ratio occupied by the second discontinuous region D2 may be defined, determined, and measured similarly based on the area ratio occupied by the first discontinuous region D1 described above. Since the functions of the first discontinuous region D1 and the second discontinuous region D2 are different, the ratios thereof may be different from each other, and a relative ratio of the first discontinuous region D1 may be higher.

Figure 7:
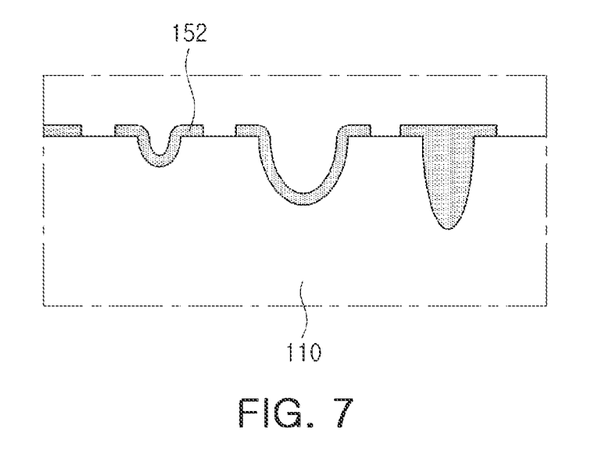
Figure 8:
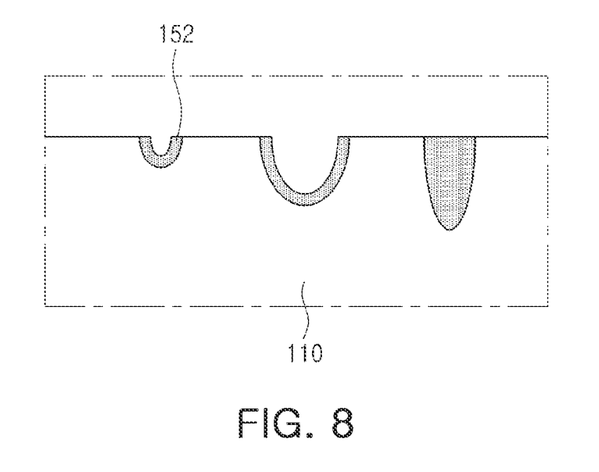

As illustrated in FIGS. 7 and 8, the second insulating coating layer 152 may fill the grooves formed on the surface of the body 110, and may effectively prevent penetration of moisture or a plating solution through defects in the body 110. In this case, the regions filling the grooves of the body 110 in the second insulating coating layer 152 may have a shape (two of the left side in FIGS. 6 and 7) coating inner walls of the grooves of the body 110, and may have a shape (one of the right side in FIGS. 6 and 7) completely filling the groove in the body 110. As illustrated, various shapes of the second insulating coating layer 152 may be mixed, and it is not necessary to completely fill the grooves of the body 110.

As described above, by forming the second discontinuous region D2 on the second insulating coating layer 152, mounting defects of the component may be reduced. When the second insulating coating layer 152 is removed by polishing or etching, all of the remaining regions other than the regions filling the grooves of the body 110 may be removed as in the exemplary embodiment of FIG. 8. In addition, similarly to the first insulating coating layer 151, a thickness of the second insulating coating layer 152 may be 2 μm or less, and when the second insulating coating layer 152 is too thick, there may be a tendency to increase mounting defects. The thickness of the second insulating coating layer 152 may be measured based on, for example, the thickest region. In one example, the thickness of the second insulating coating layer 152 may be measured based on the thickest region in a measured region in a cross section of the multilayer capacitor 100.

Hereinafter, results obtained by testing the effects of the above-described exemplary embodiments in the present disclosure will be described. As illustrated in Table 1 below, plating defects, mounting defects, and high-temperature acceleration life test were conducted while varying the ratio of discontinuous regions, coating types, and coating thicknesses of the first and second insulating coating layers. Here, as to whether or not the plating is defective, it was examined whether the plating layer was cut off by inspecting the selected points on the cross section of the sample at regular intervals (25 samples). The mounting defects were determined based on whether or not secondary phases occurred in order to examine whether defects occurred in soldering when the component was mounted on a board (400 samples). The high-temperature accelerated life test (HALT) is to measure reliability of the multilayer capacitor, such as withstand voltage characteristics, and was conducted for 80 samples.

TABLE 1

| Coating Type | Coating Thickness | First Discontinuous Region (%) | Second Discontinuous Region (%) | Plating Defect Rate | Mounting Defect Rate | High-Temperature Acceleration Defect Rate |
|---|---|---|---|---|---|---|
| No Coating | 0 nm | 100 | 100 | 0/25 | 0/400 | 16/80 |
| F-Based Polymer | 40 nm | 0 | 0 | 21/25 | 4/400 | 0/80 |
| | 220 nm | More than 90 | More than 70 | 0/25 | 0/400 | 0/80 |
| | 450 nm | More than 90 | More than 70 | 0/25 | 0/400 | 0/80 |
| | 2.1 μm | More than 90 | More than 70 | 4/25 | 1/400 | 0/80 |
| | 2.1 μm | Less than 60 | 50 | 3/25 | 1/400 | 0/80 |
| | 2.1 μm | Less than 25 | 30 | 9/25 | 2/400 | 0/80 |
| | 2.1 μm | Less than 10 | 15 | 19/25 | 1/400 | 0/80 |
| Si-Based Polymer | 250 nm | More than 90 | More than 70 | 0/25 | 0/400 | 0/80 |
| | 1.5 μm | More than 90 | More than 70 | 0/25 | 0/400 | 0/80 |
| | 2.3 μm | More than 90 | More than 70 | 9/25 | 2/400 | 0/80 |

As may be seen from the above test results, when the insulating coating layer was not formed, there were no plating or mounting defects, but the withstand voltage characteristics were poor (increase in the high-temperature acceleration test defect rate), and it is understood that moisture or plating solution penetrated through defects in the electrode layer and the body. In addition, when the discontinuous region is not formed in the insulating coating layer (0%), the plating defect rate is very high, and the mounting defect rate is also high. It was confirmed that even when the first discontinuous region exists but the ratio thereof is low, the plating defect rate increases due to plating breakage, and when the ratio of the first discontinuous regions is greater than 90%, the plating layer could be stably implemented. However, when the insulating coating layer became thick (more than 2.0 μm), it was confirmed that the plating defect partially occurred due to the restriction on the formation of the plating layer. It was confirmed that mounting defect partially occurred when the ratio of the second discontinuous region is low, and the mounting defect did not occur when the ratio of the second discontinuous region is greater than 70%.

As set forth above, according to the exemplary embodiments in the present disclosure, the moisture resistance reliability of the multilayer capacitor may be improved.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
   a body including a stack structure in which a plurality of dielectric layers are stacked and first and second internal electrodes are stacked with one of the plurality of dielectric layers interposed therebetween;
   a first external electrode connected to the first internal electrodes, and including a first electrode layer disposed on a first surface of the body which the first internal electrodes contact with, and a second electrode layer including a first plating layer covering the first electrode layer;
   a second external electrode connected to the second internal electrodes, and including a third electrode layer disposed on a second surface of the body which the second internal electrodes contact with, and a fourth electrode layer including a second plating layer covering the third electrode layer;
   a first insulating coating layer disposed between the first and second electrode layers and between the third and fourth electrode layers, and having a first discontinuous region through which the first plating layer is contact with the first electrode layer or through which the second plating layer is contact with third electrode layer; and
   a second insulating coating layer disposed on the body and having a second discontinuous region, the second insulating coating layer exposed from the first and second external electrodes,
   wherein one of the first and second insulating coating layers includes an F-based polymer.

2. The multilayer capacitor of claim 1, wherein a surface of the first electrode layer has a groove, and the first insulating coating layer is disposed in the groove in the first electrode layer.

3. The multilayer capacitor of claim 2, wherein a region filling the groove in the first electrode layer in the first insulating coating layer is disposed on an inner wall of the groove in the first electrode layer.

4. The multilayer capacitor of claim 1, wherein the first electrode layer is a sintered electrode.

5. The multilayer capacitor of claim 1, wherein a surface of the body has a groove, and the second insulating coating layer is disposed in the groove.

6. The multilayer capacitor of claim 5, wherein a region filling the groove in the body in the second insulating coating layer is disposed on an inner wall of the groove in the body.

7. The multilayer capacitor of claim 1, wherein the first and second insulating coating layers are connected to each other.

8. The multilayer capacitor of claim 1, wherein the first and second insulating coating layers include the same material.

9. The multilayer capacitor of claim 1, wherein the second electrode layer or the fourth electrode layer covers a portion of the second insulating coating layer.

10. The multilayer capacitor of claim 1, wherein another of the first and second insulating coating layers also includes the F-based polymer.

11. The multilayer capacitor of claim 1, wherein an area occupied by the first discontinuous region in the first insulating coating layer is greater than 90% of an area of the first insulating coating layer including the first discontinuous region.

12. The multilayer capacitor of claim 1, wherein an area occupied by the second discontinuous region in the second insulating coating layer is greater than 70% of an area of the second insulating coating layer including the second discontinuous region.

13. The multilayer capacitor of claim 1, wherein an area ratio of an area of the first discontinuous region to an area of the first insulating coating layer including the first discontinuous region is different from an area ratio of an area of the second discontinuous region to an area of the second insulating coating layer including the second discontinuous region.

14. The multilayer capacitor of claim 13, wherein the area ratio of the area of the first discontinuous region to the area of the first insulating coating layer including the first discontinuous region is higher than the area ratio of the area of the second discontinuous region to the area of the second insulating coating layer including the second discontinuous region.

15. The multilayer capacitor of claim 1, wherein a thickness of the first insulating coating layer is 2 μm or less.

16. The multilayer capacitor of claim 1, wherein a thickness of the second insulating coating layer is 2 μm or less.

17. The multilayer capacitor of claim 1, wherein the second electrode layer or the fourth electrode layer is disposed in the discontinuous region of the first insulating coating layer.

18. A multilayer capacitor comprising:
   a body including a stack structure in which a plurality of dielectric layers are stacked and first and second internal electrodes are stacked with one of the plurality of dielectric layers interposed therebetween;
   a first external electrode connected to the first internal electrodes, and including a first electrode layer disposed on a first surface of the body which the first internal electrodes contact with, and a second electrode layer covering the first electrode layer;
   a second external electrode connected to the second internal electrodes, and including a third electrode layer disposed on a second surface of the body which the second internal electrodes contact with, and a fourth electrode layer covering the third electrode layer;
   a first insulating coating layer disposed between the first and second electrode layers and between the third and fourth electrode layers, and having a first discontinuous region; and
   a second insulating coating layer disposed on the body and having a second discontinuous region, the second insulating coating layer exposed from the first and second external electrodes, wherein an area ratio of an area of the first discontinuous region to an area of the first insulating coating layer including the first discontinuous region is different from an area ratio of an area of the second discontinuous region to an area of the second insulating coating layer including the second discontinuous region.

19. A multilayer capacitor comprising:
a body including a stack structure in which a plurality of dielectric layers are stacked and first and second internal electrodes are stacked with one of the plurality of dielectric layers interposed therebetween;
a first external electrode connected to the first internal electrodes, and including a first electrode layer disposed on a first surface of the body which the first internal electrodes contact with, and a second electrode layer covering the first electrode layer;
a second external electrode connected to the second internal electrodes, and including a third electrode layer disposed on a second surface of the body which the second internal electrodes contact with, and a fourth electrode layer covering the third electrode layer;
a first insulating coating layer disposed between the first and second electrode layers and between the third and fourth electrode layers, and having a first discontinuous region; and
a second insulating coating layer disposed on the body and having a second discontinuous region, the second insulating coating layer exposed from the first and second external electrodes,
wherein an area occupied by the second discontinuous region in the second insulating coating layer is greater than 70% of an area of the second insulating coating layer including the second discontinuous region.

20. The multilayer capacitor of claim 19, wherein a thickness of the second insulating coating layer is 2 μm or less.

* * * * *